April 18, 1939.   LE ROY H. HOFFER   2,154,448
METHOD OF PRODUCTION OF CERTAIN TUBULAR UNITS
Filed Dec. 4, 1936
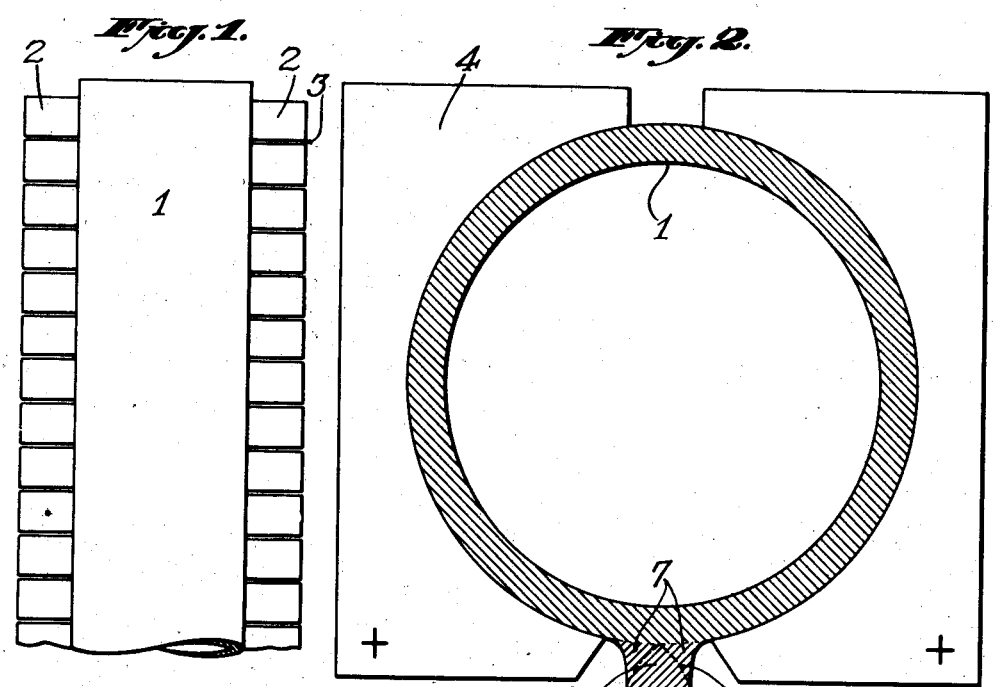
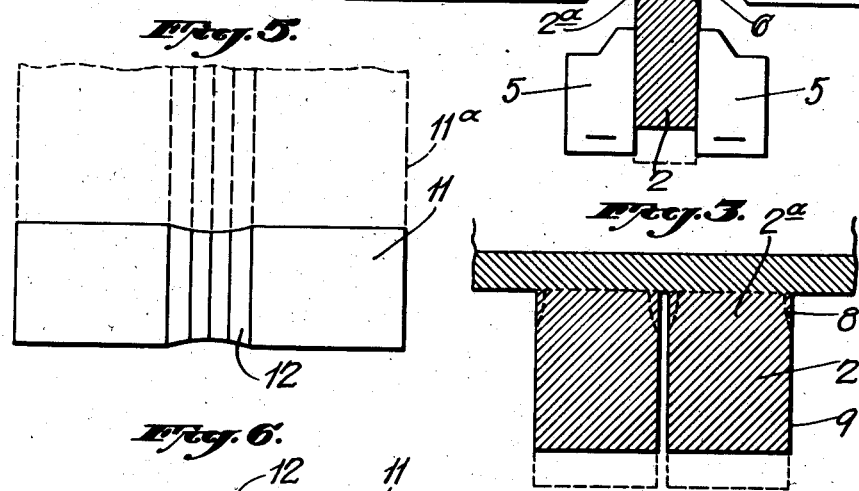
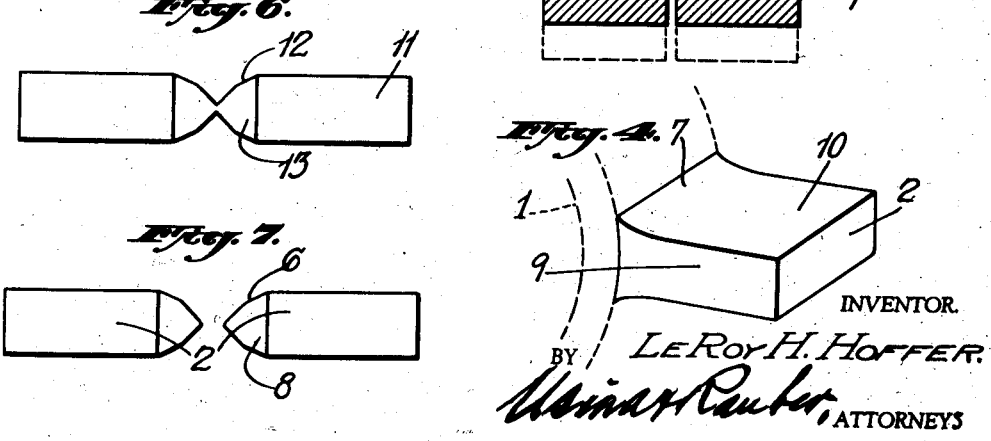
INVENTOR.
BY LeRoy H. Hoffer.
ATTORNEYS Patented Apr. 18, 1939

2,154,448

UNITED STATES PATENT OFFICE 2,154,448

METHOD OF PRODUCTION OF CERTAIN TUBULAR UNITS

Le Roy H. Hoffer, Brooklyn, N. Y., assignor to Metropolitan Engineering Company, Brooklyn, N. Y., a corporation of New York Application December 4, 1936, Serial No. 114,108

4 Claims. (Cl. 29—157.3)

In a patent to Thomas E. Murray, No. 2,029,437, of February 4, 1936, there is described a heat conducting tube designed for boiler walls, heaters and the like, having a flange or flanges extending lengthwise thereof so as to provide an increased heating surface, the flange being composed of a number of separately formed members separately welded to the tube.

It is desirable to arrange such flange members with slight spaces between them so that in the completed unit they constitute an approximately continuous wall of metal to provide the maximum heating surface available and the maximum protection for the usual outer portion of the wall consisting of refractory brickwork or cement.

The present application is directed to a method of manufacturing such units whereby the flange members can be brought more closely together than before.

The accompanying drawing illustrates an embodiment of the invention.

Fig. 1 is a side elevation of the upper end of one of the units in question; Fig. 2 is a cross-section illustrating the welding operation; Fig. 3 is a longitudinal section of the same; Fig. 4 is a perspective view illustrating separately the shape of one of the projection members; Figs. 5 and 6 are respectively a plan and an edge view of a bar after certain shaping operations; Fig. 7 is an edge view of the same divided into two pieces.

The unit in question is a tube 1 with projections or flanges at diametrically opposite points, each projection consisting of separate members 2 placed in line along the entire exposed length of the tube. A row of such tubes is set up parallel to each other with the projections in the spaces between them. The projections may overlap, as shown in the above patent, or they may be arranged end to end, or nearly so, so as to span the width of the space between the tubes. The spaces 3 between the members 2 in longitudinal alignment with each other are preferably as short as possible so as to make a nearly complete metallic wall or closure between the tubes.

A preferred method of applying the projection members is by resistance butt welding, in which the projections are pressed against the tube while they are softened by the passage of an electrical current.

According to Fig. 2, the tube 1 is clamped between a pair of positive electrodes 4. The flange segment or member 2 is clamped between negative electrodes 5. The welding current is passed and the parts are pressed together and thus welded firmly to each other.

The segment 2 (after application to the tube) is in the form of a small steel block or plate. For an ordinary boiler tube of four inches outside diameter, the segment may be about one inch in length (parallel to the length of the tube), about one and one-quarter inch in width or transverse dimension and about one-half inch in thickness. Before application to the tube, the segment is of greater width, the added width being taken up in the welding process. The take-up metal provided is indicated at 2ª in Figs. 2 and 3. This portion is bevelled along the dotted lines 6 (Figs. 2 and 7) to provide a narrow edge of contact in the beginning of the welding operation, which restricts the path for the electric current and increases the resistance and temperature; this being an old expedient for facilitating the welding operation. The quantity of take-up metal provided is so great, however, that the lateral extrusion or flow thereof during welding converts it into fillets 7 where the vertical faces of the plates merge into the tube. These fillets provide an increased area as described in the aforesaid patent for strength and for conduction of heat.

In practice it has been found desirable for boiler tubes of high capacity to reduce to a minimum the spaces between the segments so as to make the complete flange as nearly an uninterrupted metal wall as possible. The fillet which in previous methods of production has been formed at the edges, as well as at the faces of the segment where it joins the tube, has limited the closeness of the spacing of the successive segments. I propose, therefore, to remove or to eliminate such fillets on the edges. I have found that their substantial elimination can be effected by slightly reducing the length of the edge of the segment to be welded. The reduction is such that the metal extruded endwise during the welding operation can be accommodated in the space provided by such reduction and will not extend beyond the projection member; but will lie, generally speaking, within the space defined by the transverse edge of the segment.

I have found that by slight notching or tapering of the ends of the reduced portion 2ª, this limitation on the closeness of the spacing may be eliminated. For example, as shown in Fig. 3, blocks are originally provided with tapered ends 8 on the portion 2ª. In the welding operation the metal flows endwise in the space thus provided and leaves the projection member with its radial edges 9 approximately straight from end to end. Thus the members 2 may be set closer to each other than with previous methods in which the length of the welded end of the member was made larger than that of the body.

The finished shape of the projection member is substantially as shown in Fig. 4; the faces 10 which are parallel to the axis of the tube merging into fillets 7 at the inner end and the edges 9 which are transverse and lie between the successive members being substantially straight from end to end and parallel to each other, so as to permit the close spacing desired.

The shape of the members illustrated is one which can be produced economically from a rolled steel bar.

Fig. 5 shows in plan a slug 11 cut from a continuous bar, the continuity of the same being indicated in the dotted lines at 11ª. It is provided on the top and bottom faces with grooves 12 shaped to form in the finished member the bevelled faces 6 of Fig. 2. Each of the slugs 11 has also its opposite edges cut out as at 13 to provide the tapered ends 8, Fig. 3, in the finished member. And the last step in the production consists in cutting the slug 11 into two parts as in Fig. 7 for application to the tube. Or, we can start with a rolled section like one of the two parts of Fig. 7 in cross-section but continuous in length; shearing off pieces of the desired length and notching them.

In the welding operation, the successive members 2 in a line may be welded one after the other. Or, they may be welded in short groups of several projections at once. Generally, it is better to weld simultaneously at opposite sides of the tube; but the projections may be applied first at one side and then at the other.

Various modifications may be made in the several steps of the process without departing from the invention as defined in the following claims.

What I claim is:

1. The method of manufacturing tubular units of the character described which comprises the rolling of a metal bar of substantially rectangular cross-section with grooves in opposite faces extending nearly through its thickness, dividing it into slugs and cutting notches at the ends of the grooves and separating each such slug into two parts along the center of the grooves to form substantially rectangular members with one edge portion bevelled along its side faces and also of reduced length, welding the members along the edges to a tube under pressure which forces the metal of the member outward, the reduction in length being sufficient to accommodate the metal forced out so as to permit the locating of the members in line along the tube with such slight spaces between them as to constitute a practically continuous wall of metal.

2. The method of manufacturing flanged tubular units which comprises arranging flange members closely spaced in rows extending longitudinally of the tubular member and with edge portions to be taken up in welding them to the tube and welding with pressure and take-up of the metal of said members and so shaping the take-up portions originally at the edges to be taken up that when the metal thereof flows laterally it will form unfilleted approximately straight parallel edges transverse to the length of the tube where the members join the tube and filleted edges longitudinally of the tube where they join the tube.

3. The method of manufacturing flanged tubular units which comprises the shaping of flat projection members with elongated edges lengthwise of the tube and reduced length compared with the dimension of the adjacent body portions thereof taken longitudinally of the tubular member and welding said members to the tube along said elongated edges under pressure which spreads such edges, the reduction of the edges prior to welding being such as to accommodate the spread of the metal longitudinally of the tubular member without interfering with the location of the members so closely in longitudinal alignment with one another as to constitute a practically continuous wall of metal.

4. The method of manufacturing flanged tubular units which comprises shaping projection members to reduce the length of edges extending in one direction compared with dimensions, in the same direction, of the adjacent body portions thereof and welding said members to the tube in a row extending lengthwise of the tube and with said edges of reduced length lengthwise of the rows and at the weld, under pressure which spreads such edges, the reduction of the edges being such that when welded the members have their edges transverse of the tube substantially straight from end to end and parallel to each other.

LE ROY H. HOFFER.